United States Patent [19]

Osada et al.

[11] Patent Number: 4,623,943
[45] Date of Patent: Nov. 18, 1986

[54] HEAD POSITIONING APPARATUS USING A DC MOTOR

[75] Inventors: Yutaka Osada, Fujisawa; Susumu Sakakibara, Sagamihara; Hideo Nomura, Yokohama, all of Japan

[73] Assignee: Victor Company of Japan, Ltd., Japan

[21] Appl. No.: 777,080

[22] Filed: Sep. 17, 1985

[30] Foreign Application Priority Data

Sep. 19, 1984 [JP] Japan .................. 59-196429
Sep. 20, 1984 [JP] Japan .................. 59-197057

[51] Int. Cl.⁴ .................................... G11B 5/55
[52] U.S. Cl. .................................... 360/78
[58] Field of Search .................... 360/77, 78

[56] References Cited

U.S. PATENT DOCUMENTS 4,355,273 10/1982 Du Vall .................. 360/78

FOREIGN PATENT DOCUMENTS 54-1005 1/1979 Japan .................. 360/78

*Primary Examiner*—George G. Stellar
*Attorney, Agent, or Firm*—Lowe, Price, LeBlanc, Becker & Shur

[57] ABSTRACT

In a head position control apparatus, a magnetic pole disc mounted on a DC motor has a plurality of opposite magnetic poles arranged on its circumference in a predetermined relationship with tracks on a floppy disk. A sensor located close to the pole disc generates a pulse signal having pulses corresponding to the tracks and a voltage representing the actual speed of the motor. The pulses are counted in an incremental or a decremental mode. The difference between a track position indicating command signal from a keyboard and the pulse count is detected for deriving a direction signal which indicates the direction of the head and determines the count mode, a speed reference variable according to a predetermined transfer function and a switching signal when the difference reduces below a certain limit. A speed control signal is generated representing the difference between the speed reference and the actual speed of the motor. A position control signal is generated representing the difference between the amplitude of the pulse signal and a reference voltage. In response to the switching signal one of the control signals is applied to a polarity inverter for inverting or noninverting its polarity depending on the direction signal and on its amplitude relative to the reference voltage.

10 Claims, 7 Drawing Figures

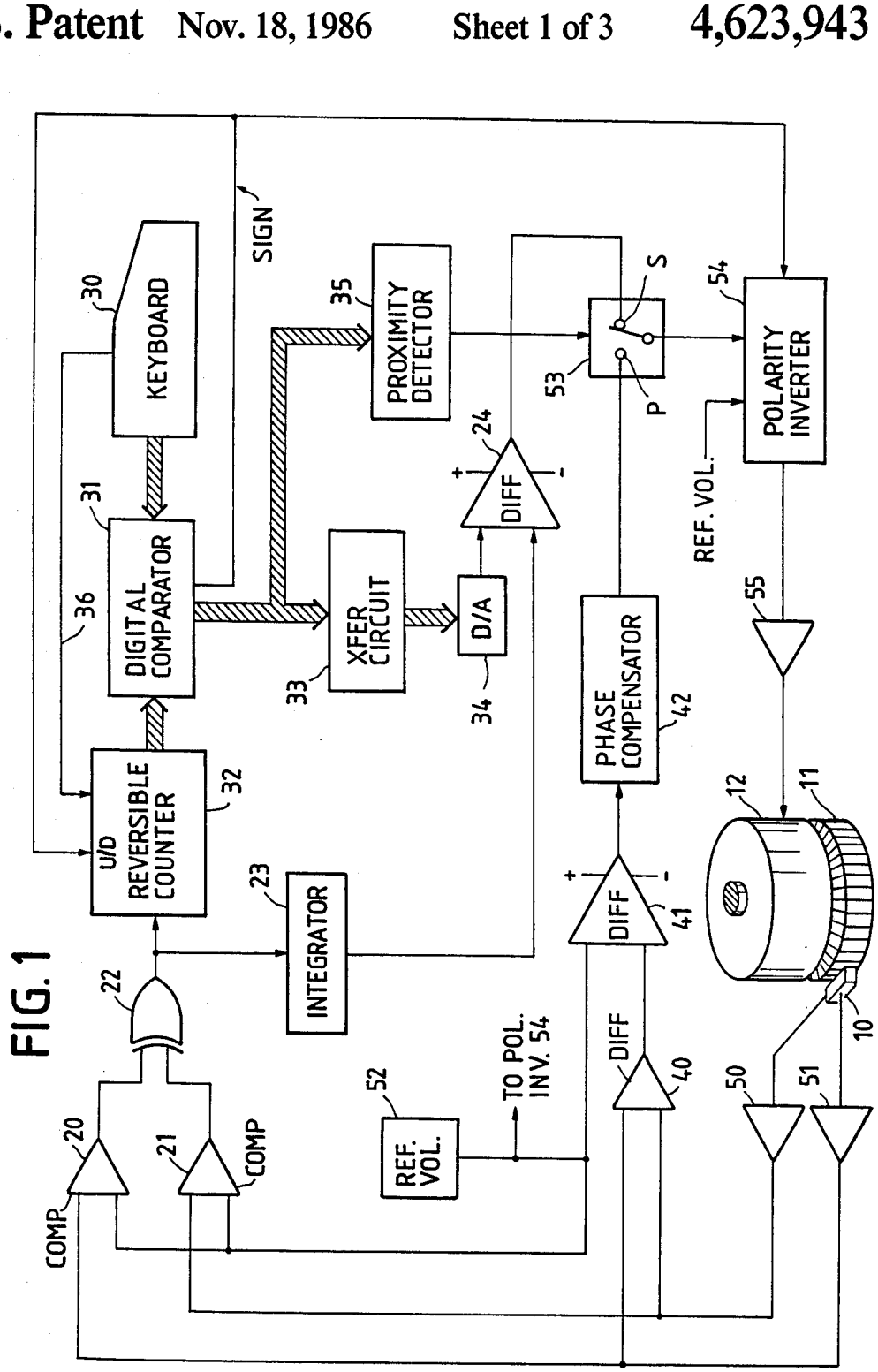

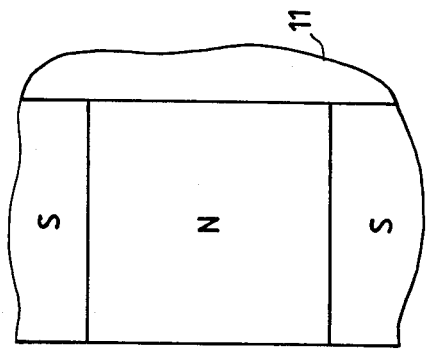
FIG. 3a
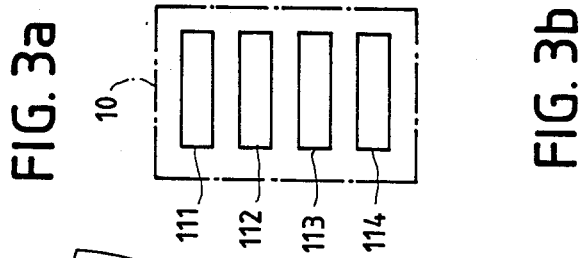
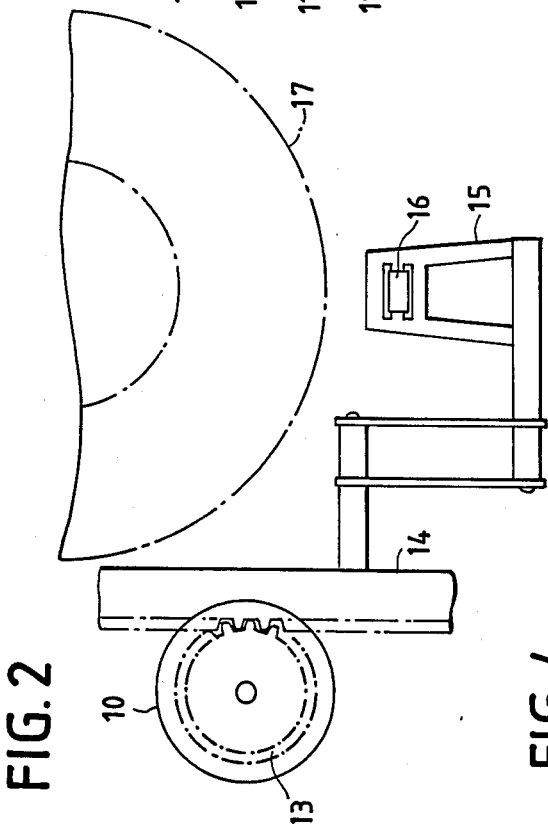
FIG. 2
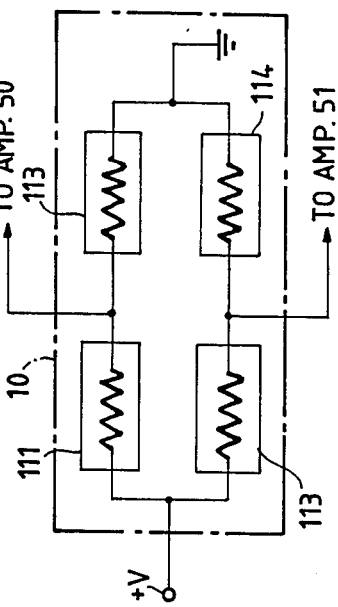
FIG. 3b
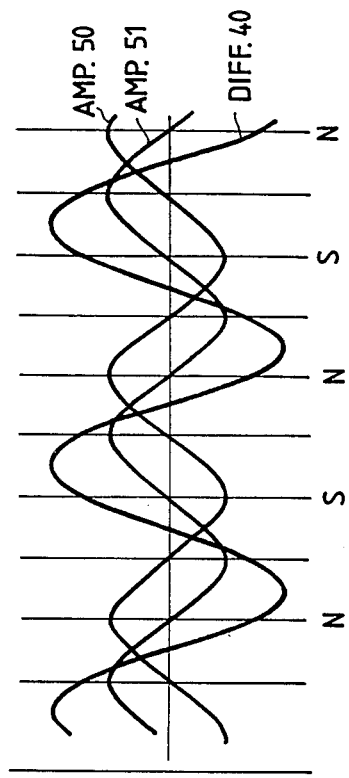
FIG. 4

HEAD POSITIONING APPARATUS USING A DC MOTOR

BACKGROUND OF THE INVENTION

The present invention relates to an apparatus for controlling the radial position of a transducer head on a magnetic disk.

In conventional floppy disk drives, a stepping motor is used to drive a magnetic head in response to pulses generated in number corresponding to the number of tracks to be skipped for positioning the head on a desired track. Because of the stepping action, rapid acceleration of the motor is difficult, and hence the access time will become substantial in the case of high track density floppy disks.

SUMMARY OF THE INVENTION

It is therefore a primary object of the present invention to provide a head position control apparatus which permits high track density recording with a high access speed.

The above object is obtained by the use of a DC motor which is rapidly accelerated by a high voltage speed control signal generated in a first feedback loop, moving the head in a short access time to the desired track. A position control signal takes over the speed control signal when the desired track is approached to precisely position the head in a second feedback loop.

More specifically, the apparatus includes a keyboard for generating a command signal indicating the radial position of a desired track on a record medium. A magnetic pole member is mounted on the motor for rotation therewith, the pole member having a plurality of magnetic poles of opposite senses arranged on a circumference thereof in a predetermined relationship with tracks on the medium. A magnetic sensor is located in proximity to the circumference of the magnetic pole member to interact with the individual poles for generating a pulse signal having pulses corresponding to the tracks and a voltage signal representing the rotational speed of the motor. A reversible counter responds to the pulse signal by counting the pulses in an incremental or a decremental mode depending on a direction indicating signal indicating the direction in which the head is to be moved to provide a count indicating the position of the head. A positional difference between the radial positions of the head and the desired track is derived from the command signal and the pulse count to develop signals including the direction indicating signal, a variable speed reference signal and a switching control signal when the positional difference reduces to a predetermined value. A differential amplifier circuit generates a speed control signal representing the difference between the speed reference signal and the voltage signal. The speed control signal is applied to a polarity inverter in which the control signal is inverted in polarity depending on the direction indicating signal and on the amplitude of the speed control signal relative to a fixed reference voltage. The DC motor is driven by the output of the polarity inverter. The motor is rapidly accelerated by a high voltage speed control signal to move the head to the intended track in a short access time.

If the record medium is provided with a prerecorded servo control signal in tracks, such servo signals can be utilized to keep the head on track. However, it is preferred that the apparatus include a second differential amplifier circuit for generating a position control signal representing the difference between the amplitude of the pulse signal and the fixed reference voltage and a selector for selecting one of the speed and position control signals in response to a switching control signal which is generated when the difference between the head position indicated by the count and the track position indicated by the command signal reduces to a predetermined value.

Preferably, the variable speed reference is derived by converting the positional difference according to a servo-control transfer function describing a nonlinear the relationship between the positional difference and the speed reference.

BRIEF DESCRIPTION OF THE DRAWINGS

The present invention will be described in further detail with reference to the accompanying drawings, in which:

FIG. 1 is a block diagram of a head position control circuit of a preferred embodiment of the present invention;

FIG. 2 is a diagrammatic view of a head drive mechanism powered by the DC brushless motor of FIG. 1;

FIG. 3a is an illustration of magnetoresistance elements arranged on the circumference of a magnetic pole disc in a positional relationship with a given magnetic pole when the head is precisely kept on a track, and FIG. 3b is a circuit diagram of the magnetoresistance elements connected in a bridge circuit configuration;

FIG. 4 is a waveform diagram illustrating first and second sinusoids generated by the bridge circuit and a third sinusoid generated by a differential amplifier which combines the first and second sinusoids;

DETAILED DESCRIPTION

Figure 5:
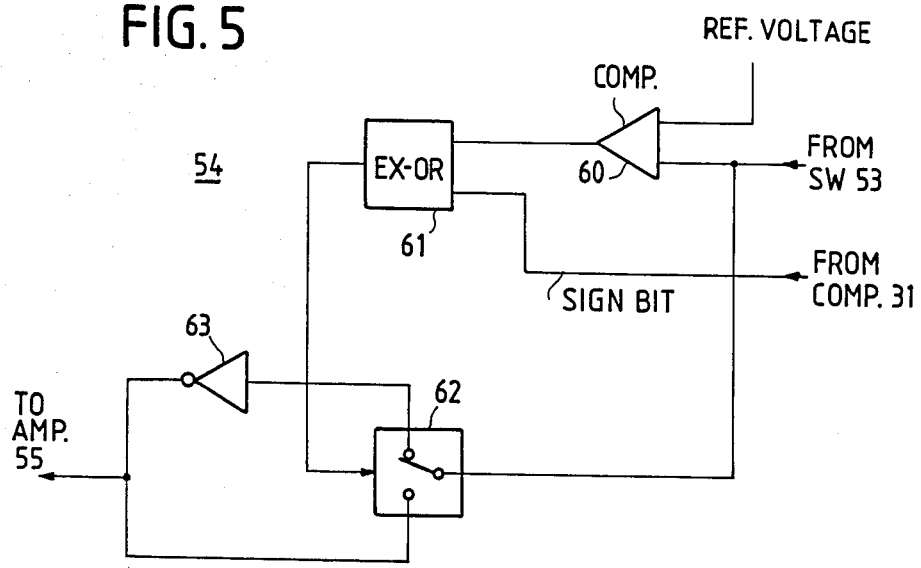
FIG. 5 is an illustration of details of the polarity inverter of FIG. 1.

A head position control circuit shown in FIG. 1 comprises an electromagnetic sensor 10 located adjacent a magnetic pole disc 11 having a plurality of alternate magnetic poles of opposite senses arranged on the circumference thereof. Magnetic pole disc 11 is mounted for unitary rotation with a DC brushless motor 12 to cause the magnetic sensor 10 to cooperate with adjacent magnetic poles to generate a pair of sinusoids having a phase difference of 90° electrical angle therebetween. The poles are oriented in vertically opposite directions and arranged one-half as many as there are tracks in a recording disk. In a typical example, there are 140 poles for a floppy disk having 280 tracks.

As shown in FIG. 2, a pinion 13, fixed to the rotary shaft of motor 10, is in mesh with a rack 14 to which a head carrier 15 is secured. Rack 14 and hence the head carrier 15 is movable in radial directions of a magnetic recording disk 17, such as floppy disk, to position the magnetic transducer head 16 on an intended track.

Magnetic sensor 10 comprises a set of four magnetoresistance elements 111, 112, 113 and 114 successively arranged on the circumference of the pole disc 11 as shown in FIG. 3a at ¼ the intervals at which the magnetic poles are arranged. Elements 111, 112, 113 and 114 are connected in a bridge circuit as shown in FIG. 3b. The bridge circuit configuration is advantageous in that it minimizes the temperature-dependent voltage outputs of the individual magnetoresistance elements. The voltages generated by the magnetoresistance elements are sinusoidal waveforms of 90° out of phase with each other.

The voltage outputs from sensor 10 are amplified by amplifiers 50 and 51 and fed to comparators 20 and 21, respectively, for comparison with a fixed reference voltage supplied from a voltage source 52 with respect to which the speed of the head drive motor 12 is controlled. Comparators 20 and 21 generate rectangular pulses of 90° out of phase with respect to each other. The pulse outputs from comparators 20 and 21 are fed to an Exclusive-OR gate 22 to generate pulses at twice the rate at which each output of the comparators 20 and 21 is generated so that pulses from generated by Exclusive-OR gate 22 during a full turn of the pole disc 11 correspond in number to the tracks on the disk 17. An integrator 23 is responsive to the output of Exclusive-OR gate 22 to convert the successive input pulses into a voltage proportional to the speed of the motor 12. The speed indicating voltage is applied to an input of a differential amplifier 24 for comparison with a speed control voltage supplied to the other input of amplifier 24 from a digital-to-analog converter 34.

A keyboard 30 supplies a command signal indicating a desired track number to a digital comparator 31 for comparison with a track number signal representing the track which is being traced by the magnetic head. The latter track number is derived from the output of a reversible counter 32 which counts pulses from the Exclusive-OR gate 22 in downward or upward direction. Comparator 31 supplies a sign bit to the up/down count mode input of the counter 32. This sign bit indicates the relative magnitude of the two track numbers and hence the direction of movement of the head 16 toward the intended track. Comparator 31 further supplies a binary output to a transfer circuit 33. This binary output represents the positional difference between the two track numbers and hence the number of tracks to be traversed by the magnetic head in radially inward or outward direction according to the sign bit.

Transfer circuit 33 converts the input binary signal applied thereto according to a predetermined servo control transfer function describing a nonlinear relationship between the number of tracks to be traversed and an optimum speed to allow the head to reach any desired track in a minimum access time. The servo control function is such that the speed reference is maintained constant at a high value when the difference so detected by comparator 31 is smaller than a predetermined value so that a high voltage output is generated by differential amplifier 24 to drive the motor 12 at high speeds. More specifically, as the positional difference decreases steadily with time as the count operation continues, the output of integrator 23 will increase from zero at the time of generation of the command signal to a constant value when the motor 12 attains a maximum speed and then decrease as the head approaches the desired track.

D/A converter 34 translates the binary output from transfer circuit 33 to a corresponding analog signal which is applied as a variable speed reference to the differential amplifier 24. The output of differential amplifier 24 represents the amount and direction of deviation of the actual speed of motor 12 from the variable speed reference. The output of differential amplifier 24 is applied to a speed-control terminal S of an electronic switch 53.

Differential amplifier 24 will generate a voltage output which is initially high to rapidly accelerate the motor 12 to attain a maximum speed in a short period of time and then decreases to a low constant value which is maintained as long as the motor is driven at the maximum speed.

The binary output of comparator 31 is further applied to a proximity detector 35. Proximity detector 35 is essentially a logic circuit which detects when the binary signal decreases below a preset value. This occurs when the head has advanced to a nearby position only displaced by ¾ to ½ of the track pitch from the desired track. When the head is in a position away from the desired track, the output of proximity detector 35 is low and switch 53 is in the speed control terminal S for coupling the output of differential amplifier 24 to a polarity inverter 54. As the head approaches the desired track, the output of the proximity detector 35 switches to a high output level and switch 51 is switched to a position control terminal P for coupling the output of a phase compensator 42 to polarity inverter 54.

Phase compensator 42 derives its input from a circuit including differential amplifiers 40 and 41. Differential amplifier 40 has its input terminals coupled to the outputs of amplifiers 50 and 51 to supply a voltage signal indicating the difference between the two 90°-displaced sinusoids from amplifiers 50 and 51 as shown in FIG. 4. It is seen that the output of differential amplifier 40 is displaced by 45° with respect to each of the sinusoids from amplifiers 50 and 51. The second differential amplifier 41 generates a voltage output representing the amount and direction of deviation of the combined sinusoid from the reference voltage. The output of amplifier 41 substantially reduces to zero when the center of magnetic sensor 10 coincides with the center of a magnetic pole to which the desired track corresponds. When this occurs, the head is precisely positioned on the intended track.

Phase compensator 42 is a well known circuit which serves to advance the phase of the head position signal from differential amplifier 41 having a frequency in the range between 30 Hz and 1 kHz for stabilizing the position servo control.

The effect of the polarity inverter 54 is to reverse the polarity of the speed and position control signals in accordance with the direction indicating sign bit from digital comparator 31 and in accordance with the voltage relationship of such control signals with the fixed reference voltage. Table below indicates the relationships between the sign bit, the relative values of the speed and position control signals (CTRL) to the reference voltage (REF) and the radial direction of the head 16 in which it is to be driven. The relative values determine the direction in which the head would be driven if the speed and position control signals were to be applied directly to motor 12.

TABLE

| SIGN BIT | VOLTAGE RELATION | HEAD DIRECTION |
|---|---|---|
| 1 | CTRL > REF | Inward |
| 1 | CTRL < REF | Outward |
| 0 | CTRL > REF | Outward |
| 0 | CTRL < REF | Inward |

Details of the polarity inverter 54 are shown in FIG. 5. Polarity inverter 54 includes a comparator 60 which compares the output of switch 53 with the reference voltage to supply an output having a discrete value indicating a direction in which the head 16 would otherwise be driven by the speed and position control signals. The output of comparator 60 is applied to an Exclusive-OR gate 61 to which is also applied the sign bit from digital comparator 31. The output of Exclusive-OR gate 61 indicates the direction in which the head is to be driven, this output being applied to the control terminal of a switch 62. Switch 62 selectively applies the output of switch 53 directly to amplifier 55 or via a unity-gain inverting amplifier 63 to the amplifier depending on the binary level of the output of Exclusive-OR gate 61. After appropriate amplification by amplifier 55, head-drive motor 12 is driven by the control signals in successive modes of speed and position control.

Figure 6:
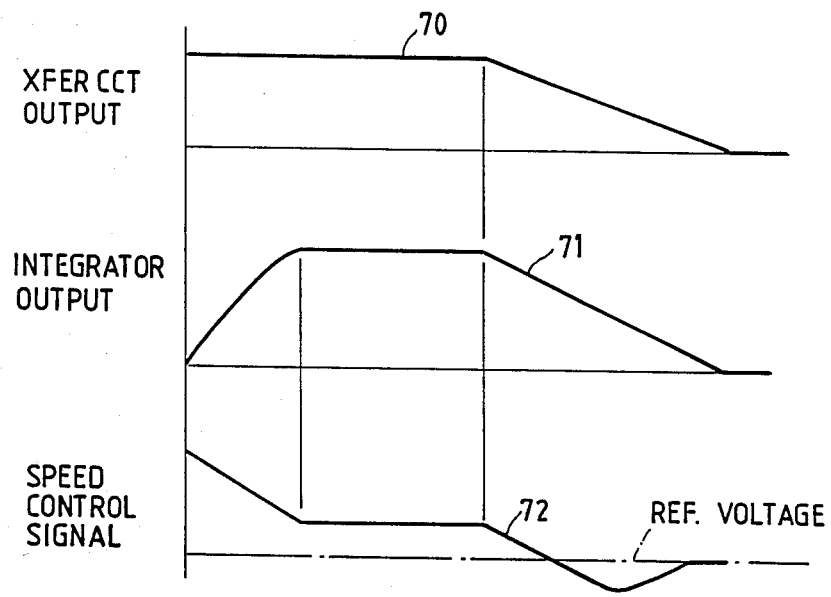
FIG. 6 is a waveform diagram useful for understanding the present invention.

The motor control circuit of the invention operates as follows. When a command signal is entered to the keyboard 30 signifying the location of a desired track, an enabling signal is applied on lead 36 to the reversible counter 32 to allow it to initiate count operation. Simultaneously, the counter 32 is supplied with a track number code from the keyboard. If the head 16 is positioned on the outermost track, the digital comparator 31 will generate a sign bit "1" indicating the inward direction of head motion and a binary code indicating the number of tracks to be skipped by the head starting from the outermost track. Reversible counter 32 operates in up-count mode in response to the inward direction sign bit for counting the pulses to be supplied from Exclusive-OR gate 22. As a function of the binary code from comparator 31, transfer circuit 33 generates a corresponding digital speed reference signal as indicated by a waveform 70 in FIG. 6. The digital speed reference signal is converted to analog form by D/A converter 34 and compared with an output signal 71 which will be generated by integrator 23 indicating the actual speed of the head.

The output of proximity detector 35 is initially low to position the selector switch 53 on the speed control terminal S, coupling the speed control signal to the polarity inverter 54 where it is compared with the reference voltage by the comparator 60. If comparator 60 supplies a binary "1" output to Exclusive-OR gate 61 to which the "1" sign bit is also applied, a binary "0" output is supplied to the polarity inverting switch 62 for coupling the high voltage speed control signal to motor 12 via amplifier 55. Upon the rotation of motor 12, pulses are supplied both to counter 32 and integrator 23. Since the transfer function of circuit 33 is such that the reference speed value remains constant at a high level for a range of small difference values initially detected by comparator 31, differential amplifier 24 generates a waveform 72 which is initially high. Motor 12 is thus rapidly accelerated and the head 16 is moved radially inward at a speed which will follow the curve 71. When the difference output from comparator 31 exceeds beyond the constant output range noted above, the transfer circuit 33 causes its output voltage to decrease monotonically with the decrease in the value of comparator 31 output such that the output of differential amplifier 24 becomes negative with respect to the reference voltage to produce a braking effect. The head speed decreases until the proximity detector 35 supplies a switching signal to the mode changeover switch 53 when it approaches the desired track, terminating the speed control operation.

A position control signal from phase compensator 42 is selected by switch 53 and applied to the comparator 60 of polarity inverter 54 to determine in which direction the head would be moved by the position control signal. Since the polarity of the position control signal to be applied to the motor depends also on the direction in which the head is moving inwardly toward the desired track, the output of Exclusive-OR gate 61 will assume a binary "0" if the head is in a position slightly short of the desired track at the termination of the speed control signal. The binary "0" from Exclusive-OR gate 61 allows the position control signal to pass through a direct path 64 to move the head slightly inward for precisely positioning it on the desired track.

If the head has moved past the desired track at the termination of the speed control signal, the output of Exclusive-OR gate 61 will be a binary "1" to couple the position control signal through the inverting amplifier 64, whereby the head is moved slightly outward for registry with the desired track.

If the head is assumed to be positioned on the innermost track when the command signal is generated, a "0" sign bit is generated indicating that the head is to be moved outward. Reversible counter 32 operates in a downcount mode to decrement its count from a value representing the innermost track number. The speed and position control signals will be processed in the same manner as described above with the exception that the reversible counter 32 and polarity inverter 54 operate in a manner inverse to that described above.

Since the motor 12 is of a DC brushless type which is capable of high speed rotation and since the reference speed provided by the transfer circuit 33 is maintained constant for a substantial part of the travelling distance, differential amplifier 24 generates a high voltage output which enables the head to be driven at high speeds. Therefore, the present invention makes possible the realization of high track density magnetic recording disks.

It is advantageous that record medium 17 be provided with a servo control signal which is recorded in track turns, either concentric or spiral, to keep the magnetic head 16 on the intended track. In such instances, the apparatus can be modified to use the prerecorded servo control signal as a position control signal instead of the signal supplied from the differential amplifier 41.

The foregoing description shows only a preferred embodiment of the present invention. Various modifications are apparent to those skilled in the art without departing from the scope of the present invention which is only limited by the appended claims. For example, the speed control circuit formed by elements 31 to 35 can be implemented by a sequence of instructions programmed in a microprocessor-based controller.

Therefore, the embodiment shown and described is only illustrative, not restrictive.

What is claimed is:

1. An apparatus for controlling the radial position of a magnetic head on a magnetic record medium, the apparatus including data entry means for generating a command signal indicating the radial position of a desired track on said medium, comprising:

a DC motor responsive to an analog signal for continuously driving said head in radial directions;

a magnetic pole member rotatable with said motor, said member having a plurality of magnetic poles of opposite senses arranged on a circumference thereof in a predetermined relationship with tracks on said medium;

detector means including a magnetic sensor for cooperating with said magnetic poles and generating a pulse signal having pulses corresponding to said tracks and a voltage signal representing the rotational speed of said motor;

counter means for varying a count in response to said pulse signal in an incremental or a decremental count mode depending on a direction indicating signal applied thereto for indicating the position of said head;

control means for deriving a positional difference between the positions of said head and said desired track from said command signal and said count and deriving therefrom said direction indicating signal and a variable speed reference signal as a function of a predetermined nonlinear relationship between said difference and the speed reference signal;

differential amplifier means for generating a speed control signal indicative of a difference between said speed reference signal and said voltage signal; and polarity inverting means for inverting or noninverting the polarity of said speed control signal depending on said direction indicating signal and on the amplitude of the speed control signal relative to a fixed reference voltage and applying the inverted or noninverted signal to said motor as said analog signal.

2. An apparatus as claimed in claim 1, wherein said control means includes means for generating a switching control signal when said positional difference reduces to a predetermined value, further comprising:

second differential amplifier means for generating a position control signal indicative of a difference between the amplitude of said pusle signal and said fixed reference voltage; and selector means for selecting one of said speed and position control signals in response to said switching control signal, wherein said polarity inverting means is responsive to an output signal of said selector means for inverting or noninverting the polarity of the selected control signal.

3. An apparatus as claimed in claim 2, wherein said magnetic poles are provided in number which is a submultiple of the number of said tracks on said record medium, and wherein said detector means comprises:

said magnetic sensor having four magnetoresistance elements arranged successively along the circumference of said magnetic pole member so that they correspond to each one of said magnetic poles, said magnetoresistance elements being connected in a bridge circuit for generating a pair of first and second sinusoids having a phase difference of 90° therebetween; and means for converting said sinusoids to a pair of first and second pulse signals as the first-mentioned pulse signal, wherein said counter means is responsive to each of said first and second pulse signals for varying said count.

4. An apparatus as claimed in claim 3, wherein said second differential amplifier means comprises:

a first differential amplifier for deriving a third sinusoid from said first and second sinusoids, said third sinusoid having a phase difference of 45° with respect to said first and second sinusoids; and a second differential amplifier for deriving a fourth sinusoid from said third sinusoid and said fixed reference voltage, said fourth sinusoid being said position control signal.

5. An apparatus for controlling the radial position of a magnetic head on a magnetic record medium, the apparatus including data entry means for generating a command signal indicating the radial position of a desired track on said medium, comprising:

a DC motor responsive to an analog signal for continuously driving said head in radial directions;

a magnetic pole member rotatable with said motor, said member having a plurality of magnetic poles of opposite senses arranged on a circumference thereof in a predetermined relationship with tracks on said medium;

detector means including a magnetic sensor located in proximity to the circumference of said magnetic pole member for generating a pulse signal having pulses corresponding to said tracks and a voltage signal indicative of the speed of rotation of said motor;

counter means for varying a count in response to said pulse signal in an incremental or a decremental count mode depending on a direction indicating signal applied thereto for indicating the position of said head;

control means for deriving a positional difference between the radial positions of said head and said desired track from said command signal and said count and deriving therefrom said direction indicating signal, a variable speed reference signal and a switching control signal when said positional difference reduces to a predetermined value;

first differential amplifier means for generating a speed control signal indicative of a difference between said speed reference signal and said voltage signal;

second differential amplifier means for generating a position control signal indicative of a difference between the amplitude of said pulse signal and a fixed reference voltage;

selector means for selecting one of said speed and position control signals in response to said switching control signal; and polarity inverting means for inverting or noninverting the polarity of the selected control signal depending on said direction indicating signal and on the amplitude of the selected control signal relative to said fixed reference voltage and applying the inverted or noninverted signal to said motor as said analog signal.

6. An apparatus as claimed in claim 5, wherein said variable speed reference signal is variable in a nonlinear relationship with said positional difference.

7. An apparatus as claimed in claim 6, wherein said predetermined nonlinear relationship is such that said speed reference signal is maintained constant at a high voltage level when said positional difference is smaller than a predetermined value.

8. An apparatus as claimed in claim 5, wherein said magnetic poles are provided in number which is a submultiple of the number of said tracks on said record medium, and wherein said detector means comprises:

said magnetic sensor having four magnetoresistance elements arranged successively along the circumference of said magnetic pole member so that they correspond to each one of said magnetic poles, said magnetoresistance elements being connected in a bridge circuit for generating a pair of first and second sinusoids having a phase difference of 90° therebetween; and means for converting said sinusoids to a pair of first and second pulse signals as the first-mentioned pulse signal, wherein said counter means is responsive to each of said first and second pulse signals for varying said count.

9. An apparatus as claimed in claim 8, wherein said second differential amplifier means comprises:
a first differential amplifier for deriving a third sinusoid from said first and second sinusoids, said third sinusoid having a phase difference of 45° with respect to said first and second sinusoids; and
a second differential amplifier for deriving a fourth sinusoid from said third sinusoid and said fixed reference voltage, said fourth sinusoid being said position control signal.

10. An apparatus as claimed in claim 5, further comprising a phase compensator connected between said second differential amplifier means and said selector means for advancing the phase of said position control signal having a frequency higher than a predetermined value.

* * * * *